July 17, 1934.  R. HEINRICH  1,966,859
APPARATUS FOR HUMIDIFYING AND COOLING DUST LADEN GASES
Filed Feb. 13, 1932
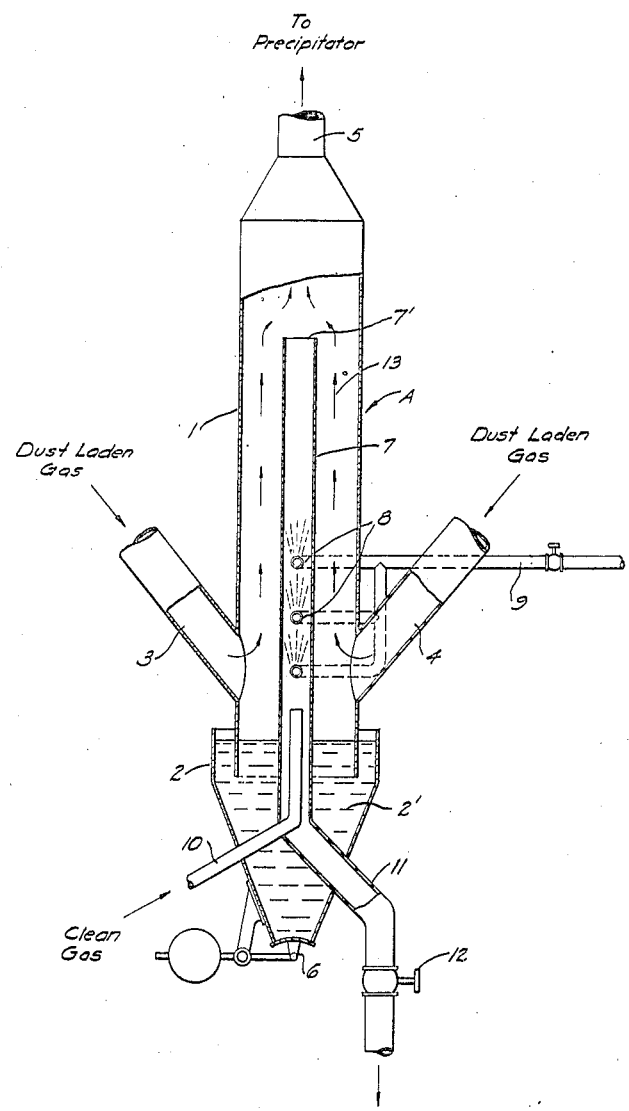
INVENTOR.
RICHARD HEINRICH
BY
ATTORNEYS Patented July 17, 1934

1,966,859

UNITED STATES PATENT OFFICE 1,966,859

APPARATUS FOR HUMIDIFYING AND COOLING DUST-LADEN GASES

Richard Heinrich, Berlin-Sudende, Germany, assignor to International Precipitation Company, Los Angeles, Calif., a corporation of California Application February 13, 1932, Serial No. 592,780
In Germany February 21, 1931

3 Claims. (Cl. 261—116)

This invention relates to the humidification and cooling of hot dust-laden gases, particularly for the purpose of facilitating subsequent separation of suspended dust or solid particles from such gases by electrical precipitation. Such humidification and cooling have ordinarily been accomplished by spraying or atomizing water or other liquid into the dust-laden gases. However, the difficulty has arisen that the larger drops of water or liquid which are inevitably formed, even with the most efficient atomizing means, are mechanically separated from the gas together with a portion of the dust and form wet deposit or sludge which either builds up on the walls of the spray chamber, or the flues, or other gas passages, or else accumulates at the bottom thereof, whence it must be removed in a form which is difficult to handle and from which it is difficult to separately recover either the dust or the liquid.

The principal object of the present invention is to provide for the humidification and cooling of such gases without introducing the above-mentioned difficulties.

According to this invention, the water or liquid is first sprayed or atomized into a separate stream of substantially clean or dust-free gas, the drops of liquid which are of sufficient size to be mechanically separated are removed from said gas stream, and said gas stream containing the remaining liquid, either in the form of vapor or fine mist or both, is then introduced into the hot dust-laden gas, with the result that further separation of liquid from the gas stream in the presence of the dust is substantially eliminated, thus preventing accumulation of wet deposits or sludge in the flues or gas passages. Furthermore, the liquid removed from the clean gas stream is in substantially clean condition and may be directly returned to the spray means, thus reducing the amount of liquid required.

The accompanying drawing is a vertical section of a form of apparatus of the present invention.

The humidifying and cooling apparatus is shown generally at A and consists of a vertically extending pipe or flue 1 of cylindrical or any other suitable shape, into which hot dust-laden gas is introduced near the lower end thereof through downwardly inclined pipes or flues 3 and 4, and from the upper end of which the humidified and cooled gases are delivered through pipe or flue 5. If desired, the pipe 1 may open at its lower end beneath the surface of a body of liquid 2' in a tank 2 which is preferably of conical shape and provided at its lower end with a weighted discharge gate 6 or any other suitable means for maintaining the desired liquid level therein.

An inner pipe 7, constituting a spray chamber, extends concentrically within the pipe 1 and opens at its upper end 7' into the interior of said pipe 1. Sprays or atomizing means 8 are provided within the inner pipe 7 and water or any other suitable liquid is supplied to said space by a pipe line 9. A pipe 10 extends into the lower portion of pipe 7 and opens into the interior thereof below the sprays 8, and said pipe 10 may be connected to any suitable source of clean gas and provided with any suitable means such as a fan or blower, where necessary, for forcing such clean gas into the pipe 7. It will be understood that, if the interior of the apparatus is at a pressure below atmospheric, said pipe 10 may merely open to the atmosphere so as to cause clean air to be drawn in by such reduced pressure. Pipe 7 may be provided with a drain pipe 11 extending from the lower end thereof out through the side wall of tank 2, and a valve 12 may be provided in said drain pipe.

In the operation of this form of apparatus, clean air or other gas is delivered through pipe 10 into pipe 7 and water or other suitable liquid is sprayed into such gas by spray means 8. The upward velocity of gas in pipe 7 is preferably so regulated that particles of liquid above a certain size are not carried upwardly by such gas but settle downwardly therethrough and are removed through drain pipe 11. A portion of the liquid introduced through the sprays may be vaporized, while a further portion thereof may be carried along in the form of a mist whose particles are of such small size as not to be mechanically separated. The clean gas, together with such vapor and liquid mist, then pass from the pipe 7 into the outer pipe 1 and mix with the hot dust-laden gases, which preferably pass upwardly therein as indicated by the arrows 10. As all of the large liquid particles have been already separated, and the quantity of liquid introduced is so regulated that the hot gases are capable of vaporizing all of the remaining liquid, the mist particles thus introduced will be vaporized, producing the desired humidification and cooling of the dust-laden gases, without causing the formation of any wet deposits or sludge in the pipe 1 or in any subsequent portion of the flues or gas passages.

Any liquid which may collect on the inner surface of pipe 7 will either be drained out through pipe 11 or will be evaporated due to heating of said pipe by the hot gases passing around the same, and any evaporation thus produced causes a further cooling of the dust-laden gases. The liquid removed through drain pipe 11 is in substantially clean condition and may, if desired, be returned to the spray means through supply pipe 9.

I claim:

1. An apparatus for humidifying and cooling gases adapted for use with an electrical precipitator, said apparatus comprising a flue for delivering hot dust-laden gases to said precipitator, a pipe extending upwardly within said flue and communicating therewith at its upper end, liquid spray means disposed within said pipe, and means for supplying substantially dust free gas to said pipe below said spray means.

2. An apparatus as set forth in claim 1, and comprising in addition, means for collecting liquid which settles by gravity to the lower portion of said pipe and returning said liquid to said spray means.

3. An apparatus as set forth in claim 1, and comprising in addition, means for maintaining a body of liquid at the lower end of said flue, and downwardly inclined gas inlet means opening into said flue between said body of liquid and the upper end of said upwardly extending pipe.

RICHARD HEINRICH.